United States Patent [19]

Verkler

[11] 4,043,426
[45] Aug. 23, 1977

[54] COMBINATION CART-CHECKSTAND

[76] Inventor: David C. Verkler, 6 Nottingham Court, Montvale, N.J. 07645

[21] Appl. No.: 735,246

[22] Filed: Oct. 26, 1976

[51] Int. Cl.² .................... E04H 3/04; B62B 11/00
[52] U.S. Cl. ........................... 186/1 AC; 186/1 A; 280/33.99 F; 280/33.99 H; 280/DIG. 4
[58] Field of Search ............... 186/1 AC, 1 R, 1 A, 186/27; 280/33.99 F, 33.99 H, 33.99 T, DIG. 4

[56] References Cited

U.S. PATENT DOCUMENTS

| 3,245,498 | 4/1966 | Stanley | 186/1 AC |
| 3,789,957 | 2/1974 | Close | 280/33.99 F |

FOREIGN PATENT DOCUMENTS

| 1,532,166 | 5/1968 | France | 280/33.99 F |

Primary Examiner—Trygve M. Blix
Assistant Examiner—Reinhard J. Eisenzopf
Attorney, Agent, or Firm—James J. Cannon, Jr.; Cannon, James J.

[57] ABSTRACT

A combination merchandise cart and checkstand in which the cart serves as part of the checkstand counter for use in the check-out systems of self-service stores comprising a rectangular merchandise basket slidably mounted on a wheeled cart frame so that the basket may be pulled to the checker and merchandise checked and bagged directly from said basket in combination with a checkstand counter adapted to receive said basket and providing a cash register and bagging station in close proximity to said extended basket for single motion unload, check and bag operation.

8 Claims, 10 Drawing Figures

COMBINATION CART-CHECKSTAND

BACKGROUND OF THE INVENTION

1. Field of the Invention

This invention pertains to merchandise check-out systems for self-service stores and in particular to a merchandise cart which also serves as part of the checkstand during the checking and bagging operations.

2. Description of the Prior Art

In a typical self-service store carts with large baskets are provided for customers to collect and transport merchandise to checkstands. The typical checkstand counter is a long rectangular counter adjacent to a cash register and divided into three physically defined segments. Normally the customer basket is unloaded onto the first segment, the merchandise is moved to the middle segment to be checked and then to the third segment to be bagged. It should be noted that the merchandise is handled three times in the typical check-out system.

In the past, efforts have been made to automate at least partially various phases of the check-out system. Among the early attempts to save time and labor were carts with removable baskets which were placed on the check-out counter to minimize the time in unloading the baskets. Next came the use of conveyor belts in the first and sometimes third segments of the check-out counter. With the introduction of conveyor belts there also came the idea of a cart adapted to the conveyor belt. Some carts were developed with sides or ends that swung open to deposit merchandise on the conveyor belts. Some carts had rollers to facilitate this movement. The ultimate mechanization of this phase of the check-out system was the cart with a basket having a conveyor belt base. When abutted against an edge of the check-out counter, the cart's conveyor belt became mechanically engaged with the counter's conveyor belt and the merchandise moved from the cart to the checker. Systems using this principle are taught in U.S. Pat. Nos. 3,036,722; 3,306,398; 3,311,197; and 3,924,709. While systems such as these eliminate one of the three handlings of the merchandise in a check-out system, they have proved ineffective in savings of time, labor and capital cost and thus are not in wide use.

The need still remains to be satisfied for a check-out system which will eliminate as much handling of the merchandise as possible, thus effecting savings in time, labor and floor space. The three major physical components of a check-out system are the cart, the check-out counter or checkstand, and the register platform. While most improvements heretofore have been directed to the cart, the checkstand deserves consideration also.

The largest physical component of a check-out system is the checkstand or counter. It is both a transport and holding device and is usually rectangular or quasi-rectangular in shape. The checkstand typically serves two purposes. First, the front segment of the checkstand serves as a transporter of merchandise from a cart to a checker. As the checker rings up the merchandise she moves it through the middle segment of the checkstand and then to the rear segment of the checkstand where it is stored temporarily and then bagged by the bagger. The typical checkstand today uses motorized conveyor belts in its first and third segments, moving merchandise to the checker and then from the checker to the bagger.

In some stores there may appear a different configuration known in the trade as on Over-the-Counter (OTC) checkstand in which the checkstand consists merely of a rear platform on which items of merchandise are placed for bagging.

The second element in a check-out system is the cart. It usually comprises a large basket mounted on a wheeled device which serves as a holding and transport device for items of merchandise which the customer wishes to purchase. The typical cart is constructed of steel, plastic coated steel or steel and plastic. The prior patent art is replete with examples of such carts. In the typical customer unloading cart, there is usually a deep basket which is slightly elevated from the floor. The customer is required to remove all selected items of merchandise from the cart and place them on the front or first segment of the checkstand, usually a motorized conveyor belt.

In some situations, there will be a checker unloading cart in which the basket is elevated much higher than the customer unloading cart. The checker unloading cart comes in two varieties, the Over-the-Counter (OTC) type or the Over-the-End (OTE) type, depending on the type of checkstand used. The Over-the-Counter cart is a checker unloading cart which fits directly over the end of the checkstand. With the OTC cart, the checker reaches into the basket for the merchandise. When the basket is empty, the cart is simply pulled toward the checker into a space between the register and the checkstand, with part of the basket moving over the checkstand.

In much the same manner the Over-the-End (OTE) cart is unloaded by the checker reaching directly into the basket. The major difference between the OTC cart and the OTE cart is that the OTE cart does not fit over the checkstand. Rather, the OTE cart rests directly against the front of the checkstand. As such, when the basket is empty, it is not pulled over the checkstand by the checker, but is removed by the customer.

The third element of a check-out system is the register stand or platform. It is simply the platform on which the register or terminal rests. It can be a freestanding unit or it can be integrated into the checkstand.

The prior art has been devoted to mechanizing one or more of the elements of a check-out system and at most to eliminating one of the three times the merchandise is handled during check-out. The pressing economic need is to integrate the physical components of the check-out system, eliminate the labor of a triple handling of the merchandise, thus saving valuable floor space and labor.

The present invention solves this problem by integrating the cart and a portion of the checkstand, two of the three major components of the check-out system. The other portion of the checkstand is redesigned to become a bagging station. With this component integration and redesign, the merchandise is handled only once from basket to bag, thus eliminating two handling steps.

There is a real need for integrating the cart and the checkstand. Present checkstands occupy approximately seventy square feet of floor space in the front of the store. This space is expensive both in terms of construction cost and in terms of loss of gross revenue from non-retail space.

The second need for integrating the cart and the checkstand arises from the two prevalent methods of check-out. In one mode the checker rings the items and moves them to the bagging area, from which the items are subsequently bagged, a double handling operation. In the other mode of operation, the checker rings the items and places them directly into the bag, thus integrating two formerly distinct operations and commonly known as "ring and bag." However, the ring and bag mode has distinct disadvantages. The customer tends to place items on the front or first segment of the checkstand in a random fashion, whence they are transported by a motorized conveyor belt to the checker, who in turn rings and bags them. However, the items reach the checker in the random order in which the customer has unloaded them. Thus, eggs, potato chips, bread, paper towels and other soft items could be the first items received by the checker. However, these items must be placed at the top of each bag. This problem is presently handled by creating an additional checkstand area known as the "set-aside" area where soft goods are temporarily placed. This set-aside area solution creates two additional problems in that it requires additional cost to the store and it requires double handling of selected items, thus defeating the purpose of the ring and bag operation.

The present invention is directed to an integral solution of the problems and costs which have arisen in prior art check-out systems. It reduces the size of the checkstand, reduces the number of times the merchandise is handled to one and significantly improves the ring and bag operation.

Reduced to its minimum the check-out system requires a platform to hold a register or electronic terminal; a platform to hold bags for merchandise; an optional platform to hold a printer, a scale, a coin dispenser or other peripheral devices; and a cart. The present invention integrates the cart into the checkstand and simplifies the ring and bag operation to its minimum, thereby eliminating the present problems of that operation.

SUMMARY OF THE INVENTION

This invention pertains to a combination cart-checkstand for use in check-out systems of self-service stores. The cart comprises a rectangular basket slidably mounted on a wheeled frame such that the basket can be pulled laterally over a portion of the checkstand adjacent to the cashier-checker, the basket mounted on a full suspension roller mechanism. The basket thus serves as the merchandise holding area of the checkstand as the merchandise is being checked and bagged. The checkstand itself is designed in a generally U-shaped configuration to accommodate the basket at its base; cash registers, electronic scanners, scales and other check-out equipment on each leg and having a bagging station on the extremes of each leg of said U-shaped checkstand. The checker-cashier stands in the middle of the checkstand with all merchandise and equipment within easy reach.

In operation, the cart is pushed adjacent to the checkstand counter and the basket is pulled forward over the base counter of the U-shaped checkstand. The cashier selects items of merchandise from the basket, rings them up or passes them by an electronic scanner and places them in a bag at a bagging station. When bagging is completed the bags are placed in the basket which is pushed back onto the cart for transport to the exit.

Alternative embodiments are provided, but all embodiments utilize the cart to serve the storage function of the checkstand; all embodiments reduce the handling of merchandise to one time; all embodiments move the merchandise laterally across a counter rather than lengthwise down the counter; and all embodiments result in a significantly smaller checkstand.

DESCRIPTION OF THE PREFERRED EMBODIMENT

Figure 1:
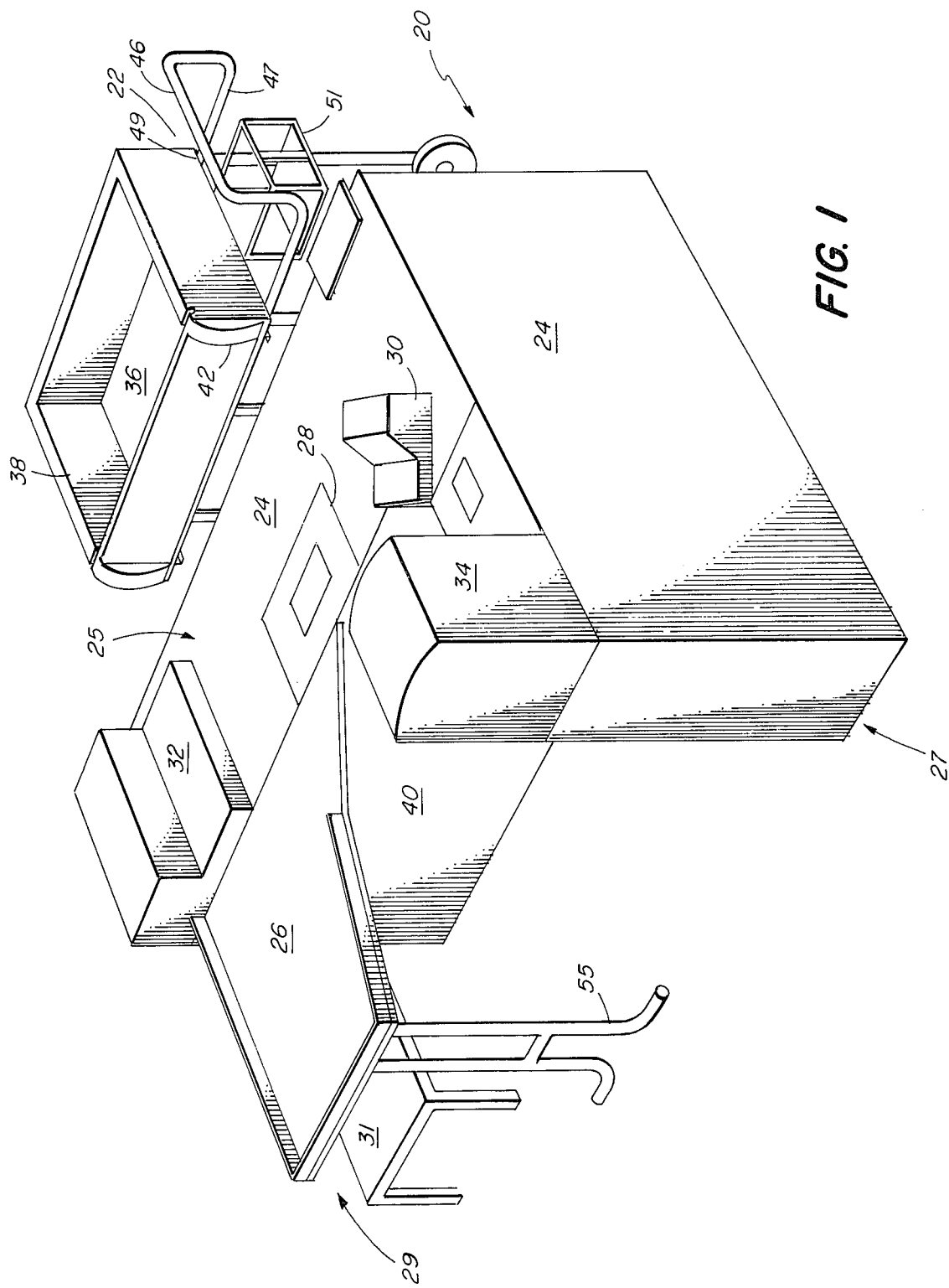
FIG. 1 is a side perspective view of a cart-stand configuration showing the cart adjacent to the checkstand prior to check-out.
Figure 2:
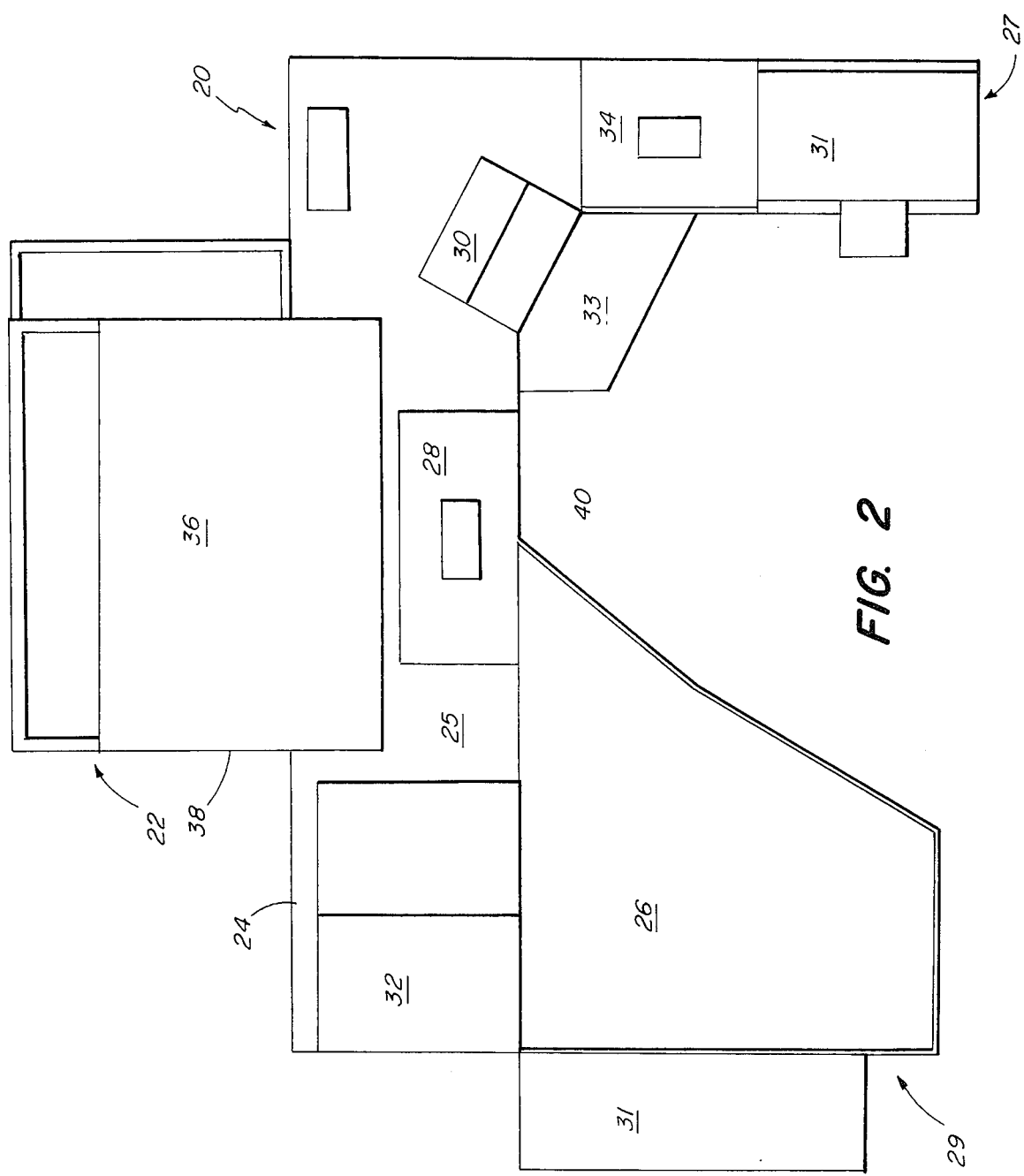
FIG. 2 is a top plan view of the checkstand of FIG. 1.

Referring now to the drawings, and in particular to FIGS. 1 and 2, there are shown a perspective view and a top plan view of an integrated check-out system designated generally by the reference numeral 20. Check-out system 20 includes a cart 22, a checkstand 24 and a bagging station 26. In FIGS. 1 and 2, various peripheral devices are also illustrated in profile such as a scanner 28 for electronic scanning of bar codes, a register 30 for totaling cash purchases, a scale 32, a coffee grinder 34 and the like.

Figure 5:
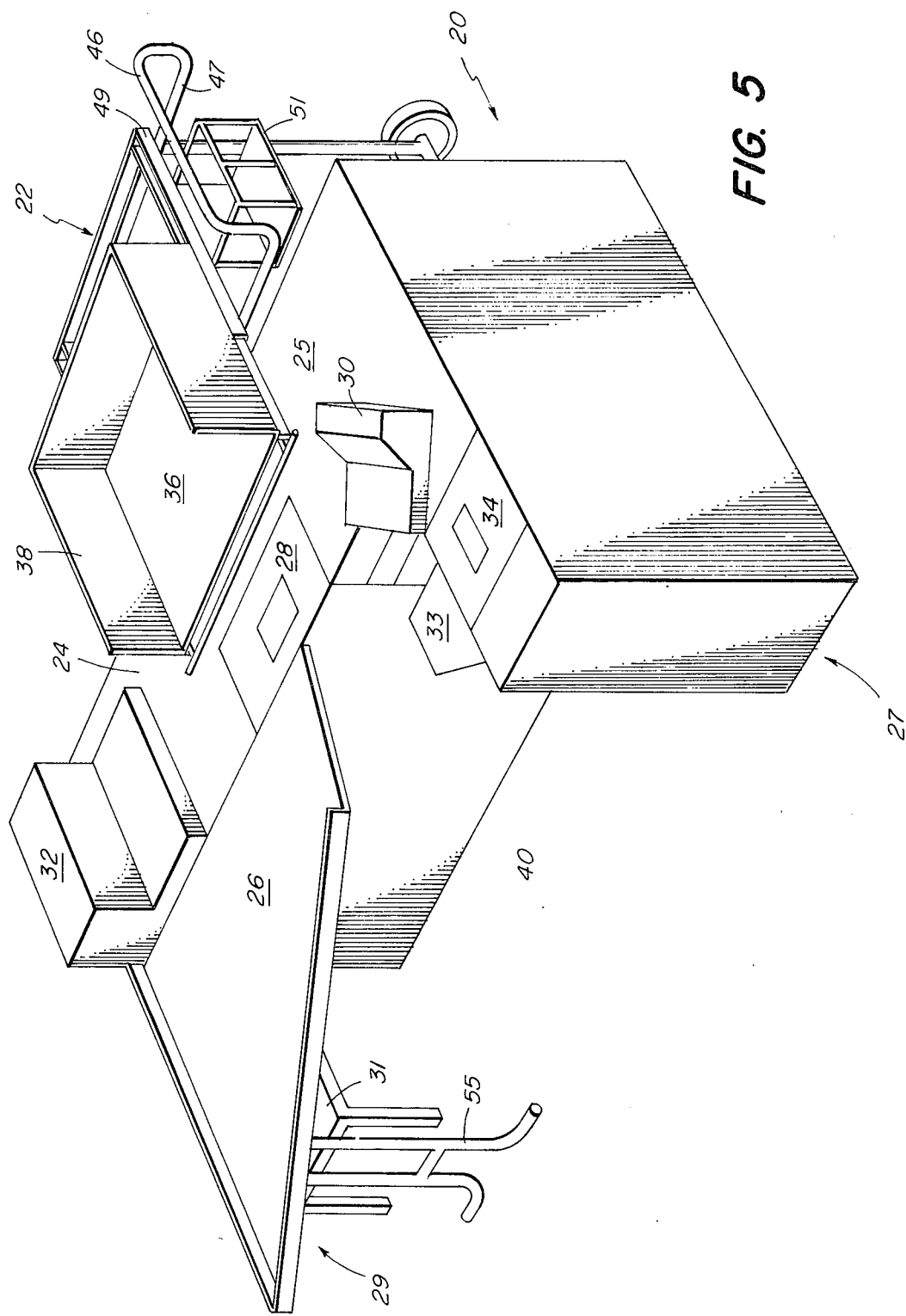
FIG. 5 is a side perspective view showing the cart of FIGS. 1, 3 and 4 in position for check-out.

FIG. 1 represents a generalized perspective view of the present invention in which a cart 22 is adjacent to the checkstand 24 prior to the checking out of the merchandise. Checkstand 24 is approximately U-shaped in configuration having a generally extended base leg 25 and two shorter side legs 27, 29. Base leg 25 is adapted to receive either the merchandise or the basket of cart 22 as will be hereinafter described. The side legs 27, 29 are positioned to receive the cash register 30, the scale 32, the coffee grinder 34, and similar peripheral equipment. Bagging stations 26 also are positioned at the ends of side legs 27, 29. Electronic scanner 28 is positioned immediately adjacent to the merchandise holding area on base leg 25. From FIG. 1, it is apparent that the top surface of the checkstand 24 of this invention must be lower than the base 36 of the cart basket 38. Checkstand 24 has a lateral or latitudinal orientation rather than a lengthwise or longitudinal orientation as in the prior art. The cashier stands at the central cut-out 40 of checkstand 24. In the various embodiments of this invention, as explained in detail hereinafter, the cart basket 38 serves also as the holding area for merchandise to be checked out, when said cart basket is extended over base leg 25, as illustrated in FIG. 5. The cashier has available one or two bagging stations 26. The cashier, mindful of bagging requirements, selects items of merchandise from cart basket 38, rings up each item and places it immediately in a bag. In this operation, the merchandise is handled only once as it passes from cart to bag. If an electronic scanner 28 is available to read the universal product code on each package, the package is lifted past the scanner when moved from the cart basket 38 to the bag. When scanner 28 is in use, basket 38 is extended laterally as shown in FIGS. 2 and 5, and does not extend over scanner 28. The reach of the checker is about the same distance as for conventional checkstands. Areas of the checkstand 24 immediately adjacent to the cart-merchandise area are used to support the register 30, the scanner 28, the scale 32, the coffee grinder 34 and other peripheral devices. The provision of checker selection from the cart basket 38 and two bagging stations 26 both contribute to the elimination of a set aside area for soft goods. The top plan view of FIG. 2 also shows optional bagging area 31. Bagging area 26 is a shelf hinged to checkstand leg 27 and having folding legs 55 for storage. Bagging area 33 is simply a pull-out shelf.

Figure 6:
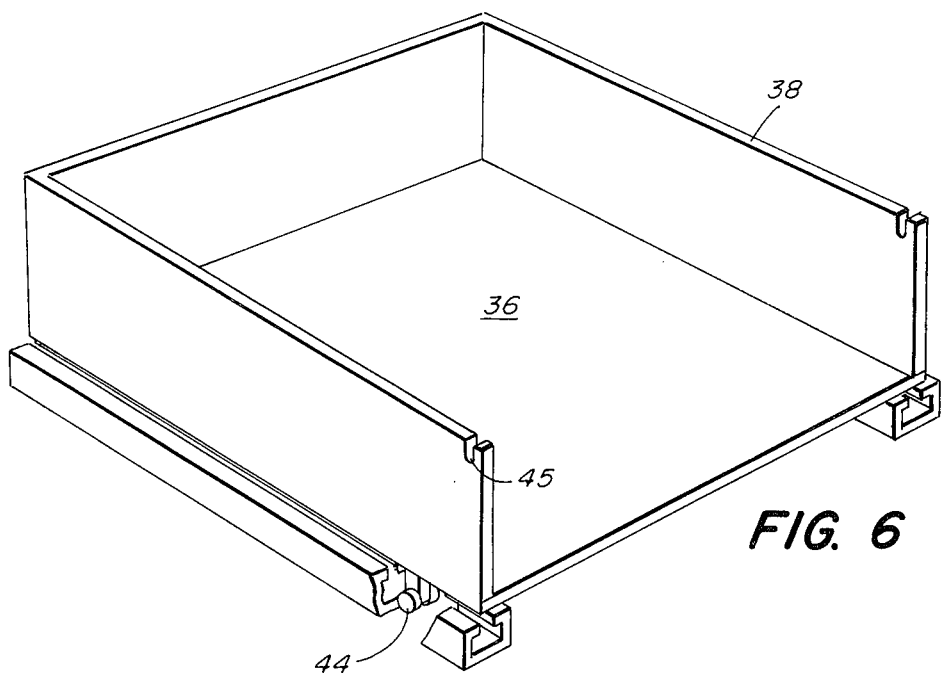
FIGS. 6, 7 and 8 illustrate the full suspension system of the basket on the cart frame of the carts of FIGS. 1 through 5.
Figure 7:
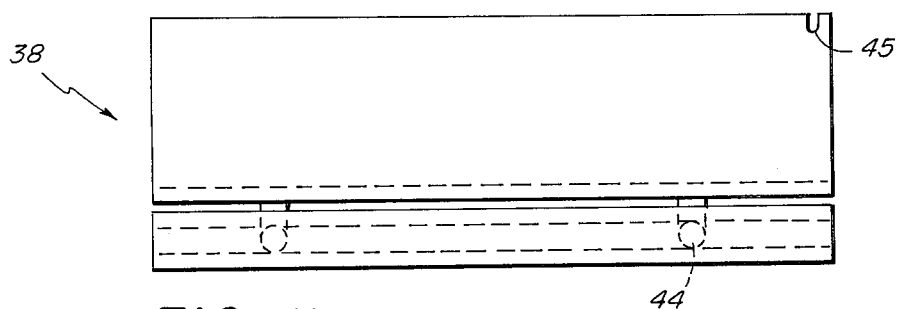

FIGS. 3 through 8 illustrate one version of a cart which can also serve as part of a checkstand. Cart 22 has a flat level basket 38 mounted on a wheeled car frame 39 whose height from the floor is slightly greater than the level central portion of base leg 25 of checkstand 24. Cart basket 38 is laterally oriented and includes a fold down side 41, which slides under base 36 of basket 38, and is mounted on a full-suspension roller system to slide over the base leg 25 of checkstand 24 to bring basket 38 close to the cashier. Handles 42 (FIG. 1) are provided to facilitate the pulling of basket 38. Folding side 41 has hooks 43 to attach to bars 45 when in a raised position. Cart frame 39 is tapered toward its front end to permit nesting of carts. Details of the suspension system 44 are illustrated in FIGS. 6 and 7.

Figure 3:
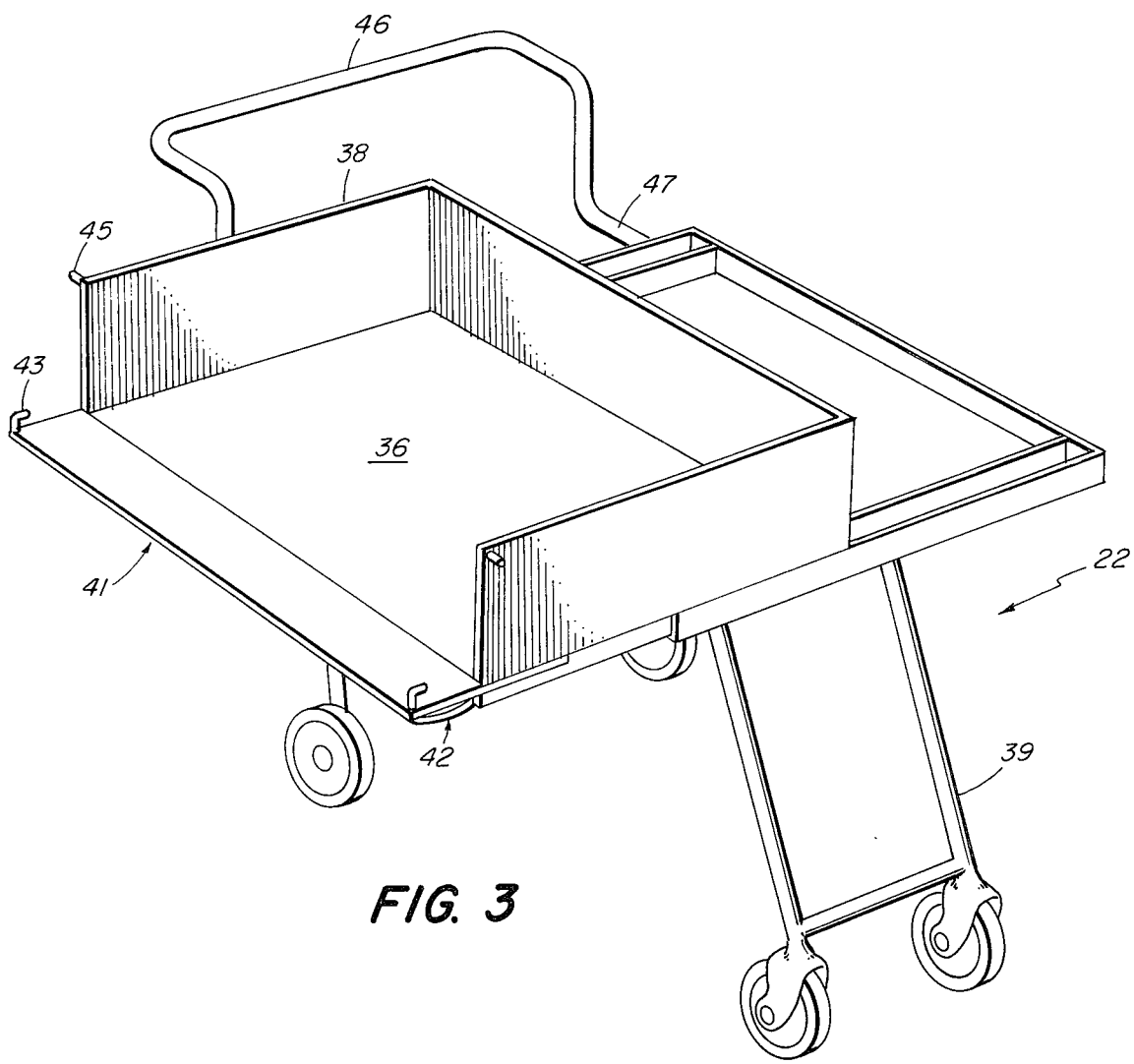
FIG. 3 is a side perspective view of the cart shown in FIG. 1.
Figure 4:
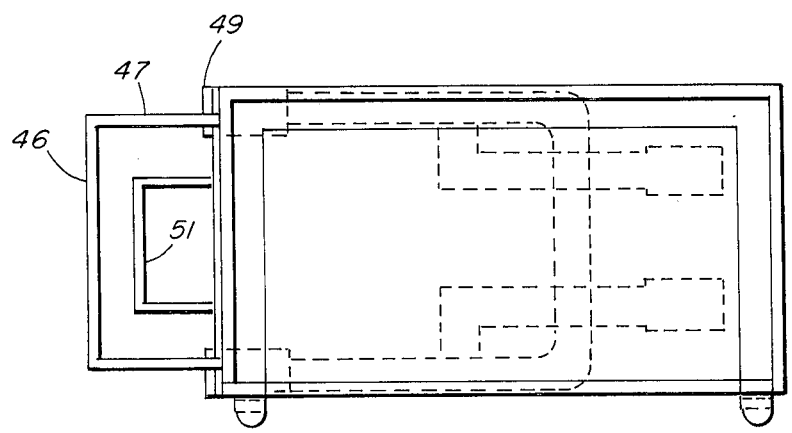
FIG. 4 is a top plan view of the cart of FIG. 1.
Figure 8:
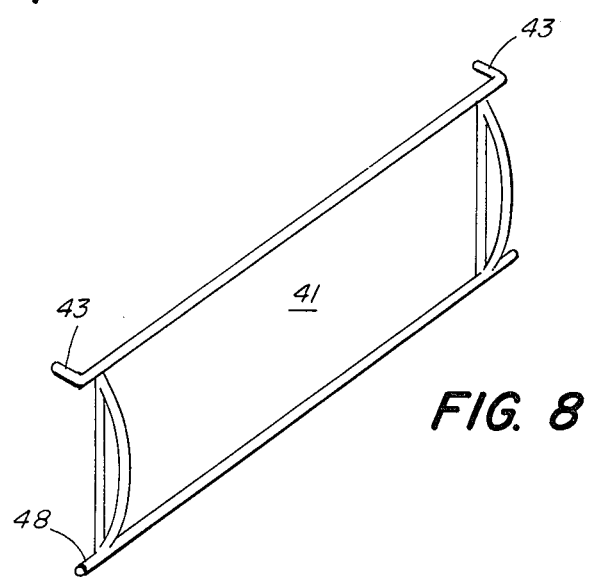

FIGS. 3 and 4 are side perspective and top views of the preferred embodiment of cart 22 and slidable basket 38. FIG. 3 illustrates in side view cart 22. Cart 22 has a handle 46 by which the customer pushes cart 22. Handle 46 is connected to cart 22 by horizontal bars 47. Basket 38 is hinged at end 49 so that it may swing upward to a vertical position and its end 49 rest on horizontal bars 47. This folding feature permits nesting of carts 22. A baby basket 51 is positioned at end 49 of cart 22 exterior to basket 38. FIG. 5 illustrates basket 38 in position for check-out over base leg 25 of checkstand 24. FIG. 3 illustrates basket 38 in a partially extended position. FIGS. 6 and 7 illustrate the full suspension roller means by which basket 38 is laterally moved over checkstand 24. FIGS. 6 and 8 also illustrate bars 48 at the base of folding side 41 which fit into looped channel 50 of base 38 of basket 38 to permit side 41 to fold up and down and slide under basket 38.

Figure 9:
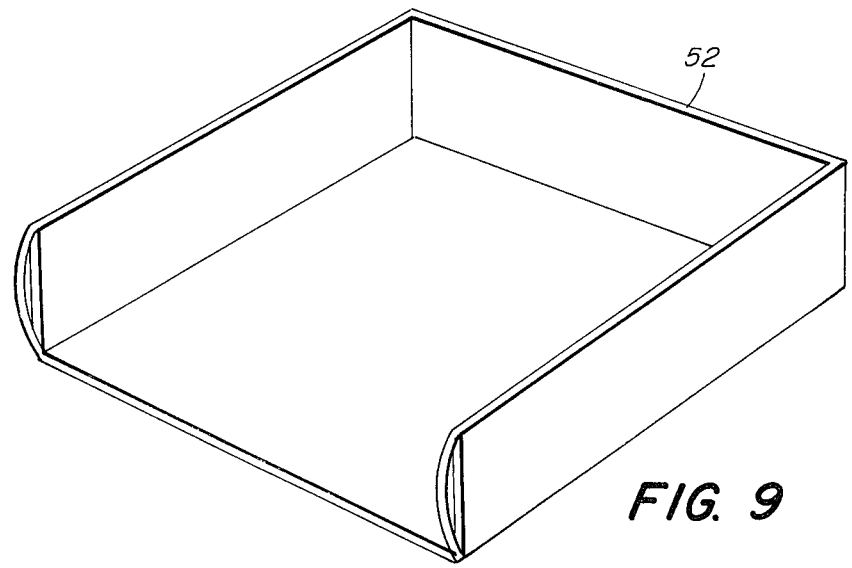
FIGS. 9 and 10 illustrate an alternative embodiment of a basket insert.
Figure 10:
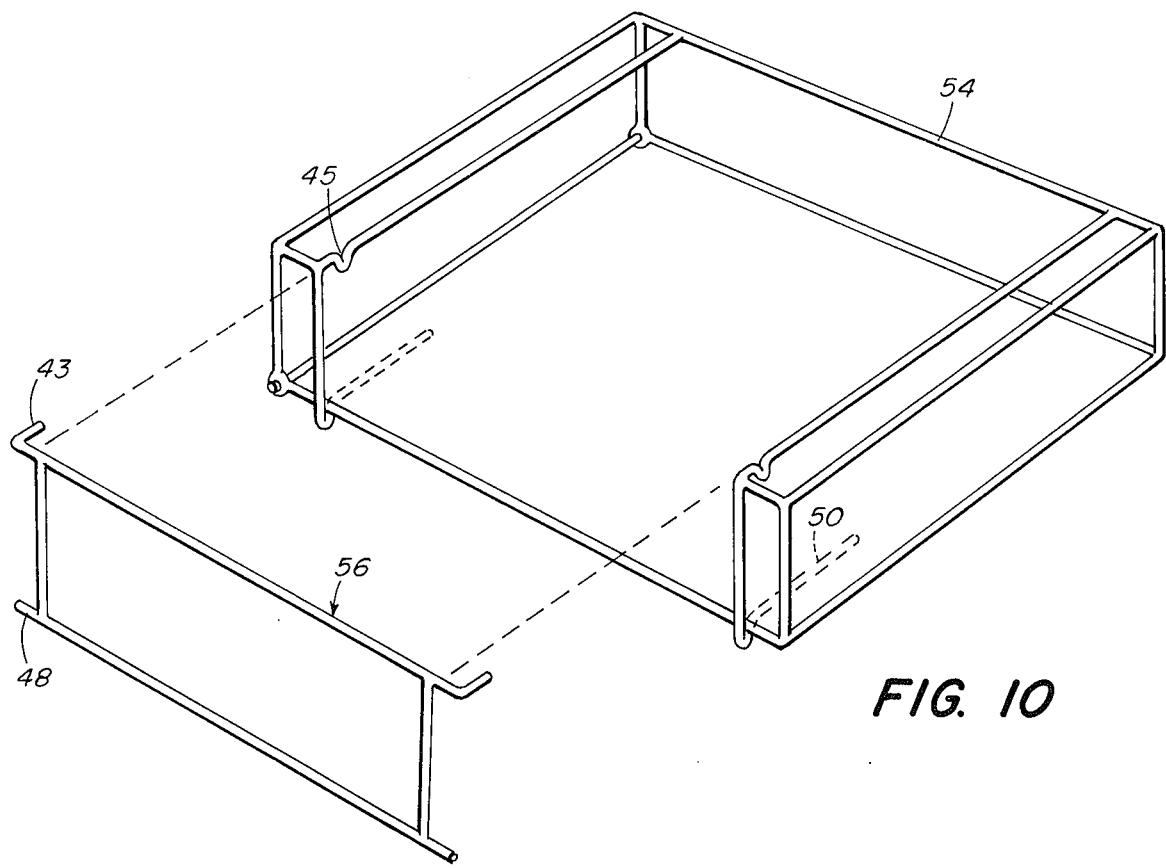

An alternative embodiment of basket 38 is illustrated in FIGS. 9 and 10. In this version an insert 52 in basket 54 is pulled laterally toward the cashier and is similarly mounted on a full suspension system. In external physical appearance, this alternative does not differ materially from the prior version shown in FIGS. 3 through 8. Side 56 is pulled down and slid under basket 54 before insert 52 is pulled toward the cashier.

A third alternative embodiment (not illustrated) is possible in which basket 38 has a conveyor belt base which is engaged by rollers at checkstand 24 to move the merchandise towards the cashier.

FIG. 5 is a perspective view of cart 22 in which basket 38 is partially pulled laterally and side 41 is pulled down and placed under basket 38. In FIG. 5, the basket 38 is in position for checkout when scanner 28 is in use. The maximum reach to retrieve merchandise from the basket 38 does not exceed the reach presently required of a cashier. FIG. 5 also illustrates a slightly different arrangement of checkstand 24. Large bagging area 26 stands on folding legs 55, so that area 26 may be folded down when not in use.

In all the embodiments described, a system for checkout of merchandise has been presented in which merchandise never leaves the basket until checked. Either the basket or an insert therein is pulled immediately in front of the checker and the merchandise stays in the cart basket until it is checked and bagged in one operation. In all the alternative embodiments the cart basket serves as the merchandise storage area of the checkstand, the movement of merchandise is parallel to the latitudinal axis of the checkstand rather than parallel to the longitudinal axis as in the present art, and the merchandise is handled only once in the process of checkout. Furthermore, depending upon the number of peripheral devices placed on the checkstand, the average checkstand built according to the principles of this invention will occupy 36 to 46 square feet of floor space, as opposed to present checkstands which occupy about 70 to 85 feet of floor space. This system results in significant savings in labor and time in check-out and it further results in a checkstand of approximately one-half of the size of a conventional checkstand, thus saving valuable floor space.

The system of this invention is particularly adaptable to checkstands utilizing electronic data terminals as cash registers and electronic scanners for reading the universal product codes and prices. In the case of a scanner, the merchandise is simply moved over the scanner on its way from the basket to the bag. The precise dimensions of the checkstand would have to meet the scanner standards adopted by various industries.

While certain embodiments of this invention have been shown and described by way of illustration, many modifications within the true spirit and scope of this invention and within the scope of the following claims will occur to those skilled in the art.

I claim:

1. A combination cart-checkstand for a merchandise check-out system in self-service stores comprising in combination:
   a checkstand having a cash register, at least one bagging station, and having immediately adjacent to said cash register and bagging station provision for a cashier;
   a merchandise cart comprising a frame having handles and having a merchandise basket slidably mounted on said frame such that said merchandise basket may be moved laterally toward said cashier's position;
   said merchandise basket being substantially rectangular in shape and mounted by means of full suspension sliding rollers, and having one side which folds down and under said basket for easy removal of merchandise;
   said merchandise basket when extended over said checkstand, serving as the merchandise holding and storage area of said checkstand during the checking and bagging operations.

2. The merchandise check-out system of claim 1 wherein said slidable basket has handles on each end for pulling said basket toward a cashier.

3. The merchandise check-out system of claim 1 wherein said checkstand includes an electronic scanner.

4. The merchandise check-out system of claim 1 wherein said checkstand includes at least two bagging stations.

5. The merchandise check-out system of claim 1 wherein said cart basket has a slidably mounted insert with handles to be pulled toward said cashier position.

6. The merchandise check-out system of claim 1 wherein the basket of said cart is hinged to fold upwards and rest on the handles of said cart for the nesting of carts.

7. The merchandise check-out system of claim 1 wherein said cart further includes a baby seat attached to the exterior of said cart frame.

8. A merchandise cart for the transport and check-out of merchandise comprising in combination:

A wheeled cart frame, the base of which is tapered at its forward end to permit nesting of carts;

an L-shaped handle at the rear end of said cart frame for pushing said cart;

a basket frame having a full suspension roller system mounted on said cart frame such that said basket frame is hinged at one end to be rotated upwards to rest on the base leg of said L-shaped handle for the nesting of carts;

a rectangular basket slidably mounted within the full suspension roller system of said basket frame such that said basket slides laterally toward a checkstand;

said basket having one side wall facing a checkstand which folds down and under said basket for easy unloading of merchandise.

* * * * *